United States Patent
Choi

(10) Patent No.: US 12,270,921 B2
(45) Date of Patent: Apr. 8, 2025

(54) DRIVER ASSISTANCE SYSTEM AND METHOD FOR CORRECTING POSITION INFORMATION OF A VEHICLE

(71) Applicant: HL KLEMOVE CORP., Incheon (KR)

(72) Inventor: Jaebum Choi, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 408 days.

(21) Appl. No.: 17/572,627

(22) Filed: Jan. 11, 2022

(65) Prior Publication Data
US 2023/0221451 A1    Jul. 13, 2023

(30) Foreign Application Priority Data
Dec. 4, 2020    (KR) .................. 10-2020-0168001

(51) Int. Cl.
*G01S 19/48*    (2010.01)
*G01S 17/86*    (2020.01)
(Continued)

(52) U.S. Cl.
CPC ............ *G01S 19/485* (2020.05); *G01S 17/86* (2020.01); *G01S 17/89* (2013.01); *G01S 19/49* (2013.01)

(58) Field of Classification Search
CPC ........ G01S 19/485; G01S 17/86; G01S 17/89; G01S 19/04
See application file for complete search history.

(56) References Cited

U.S. PATENT DOCUMENTS

| 2008/0228396 A1* | 9/2008 | Machii ............... G01C 21/3837 701/533 |
| 2009/0018772 A1* | 1/2009 | Watanabe ............ G01C 21/165 701/472 |

(Continued)

FOREIGN PATENT DOCUMENTS

| JP | 2020-38200 | 3/2020 |
| KR | 10-1438659 | 9/2014 |

(Continued)

OTHER PUBLICATIONS

Office Action dated Dec. 12, 2024 for Korean Patent Application No. 10-2020-0168001 and its English translation provided by Applicant's foreign counsel.

*Primary Examiner* — James J Lee
*Assistant Examiner* — Steven Vu Nguyen
(74) *Attorney, Agent, or Firm* — WOMBLE BOND DICKINSON (US) LLP

(57) ABSTRACT

Provided is a driver assistance system that may acquire more accurate position information of a vehicle without extracting landmark information or feature point information around the vehicle, the driver assistance system including: a global positioning system (GPS) module configured to acquire GPS information of the vehicle; a lidar configured to acquire point cloud data for an outside field of view of the vehicle; a communicator configured to receive a high definition map; and a controller comprising at least one processor configured to process the point cloud data, the high definition map, speed data and steering angle data, the speed data and the steering angle data being received through a vehicle communication network, wherein the controller is configured to generate dead reckoning information in response to processing the speed data and the steering angle data, generate position information of the vehicle based on the dead reckoning information and the GPS information, acquire (Continued)

intensity data around the vehicle in response to processing the high definition map received based on the position information, and compare the intensity data and the point cloud data to correct the position information.

13 Claims, 7 Drawing Sheets

(51) Int. Cl.
    *G01S 17/89*     (2020.01)
    *G01S 19/49*     (2010.01)

(56) References Cited

U.S. PATENT DOCUMENTS

| | | | |
|---|---|---|---|
| 2018/0058856 A1* | 3/2018 | Catherall | H04W 48/04 |
| 2018/0167783 A1* | 6/2018 | Khoche | C09J 7/38 |
| 2018/0192059 A1 | 7/2018 | Yang et al. | |
| 2019/0186925 A1* | 6/2019 | Lee | G01C 21/3658 |
| 2020/0122775 A1* | 4/2020 | Hasejima | B62D 15/0285 |
| 2021/0179138 A1* | 6/2021 | Terazawa | G01C 21/3476 |
| 2022/0324437 A1* | 10/2022 | Blau | H04N 23/698 |
| 2023/0010175 A1* | 1/2023 | Kato | G01S 17/931 |

FOREIGN PATENT DOCUMENTS

| | | |
|---|---|---|
| KR | 10-2069666 | 1/2020 |
| KR | 10-2137043 | 7/2020 |

\* cited by examiner

DRIVER ASSISTANCE SYSTEM AND METHOD FOR CORRECTING POSITION INFORMATION OF A VEHICLE

CROSS-REFERENCE TO RELATED APPLICATION

This application is based on and claims priority under 35 U.S.C. § 119 to Korean Patent Application No. 10-2020-0168001, filed on Dec. 4, 2020 in the Korean Intellectual Property Office, the disclosure of which is incorporated herein by reference.

BACKGROUND

1. Technical Field

The disclosure relates to a driver assistance system and driver assistance method, and more specifically, to a driver assistance system and driver assistance method that may accurately determine a position of a vehicle.

2. Background Art

An autonomous driving system enables a vehicle to travel without a driver's operation based on information about lanes and objects outside the vehicle.

An accurate position determination of vehicle is critical for the realization of improved autonomous driving system.

Although a method of determining a position of a vehicle using a global positioning system (GPS) information has been used, the method is less accurate and has limitations.

SUMMARY

An aspect of the disclosure provides a driver assistance system and driver assistance method that may obtain an accurate position of a vehicle by determining a position of the vehicle using dead reckoning and correcting the position using intensity data of a high definition map and point cloud data of lidar.

Additional aspects of the disclosure will be set forth in part in the description which follows and, in part, will be obvious from the description, or may be learned by practice of the disclosure.

According to an aspect of the disclosure, there is provided a driver assistance system, including: a global positioning system (GPS) module configured to acquire GPS information of a vehicle; a lidar configured to acquire point cloud data for an outside field of view of the vehicle; a communicator configured to receive a high definition map; and a controller including at least one processor configured to process the point cloud data, the high definition map, speed data of the vehicle and steering angle data of the vehicle, wherein the controller is configured to generate dead reckoning information of the vehicle in response to processing the speed data and the steering angle data, generate position information of the vehicle based on the dead reckoning information and the GPS information, acquire intensity data around the vehicle in response to processing the high definition map received based on the position information, and compare the intensity data and the point cloud data to correct the position information.

The controller is configured to generate the position information of the vehicle by combining the dead reckoning information and the GPS information.

The controller is configured to select one from the dead reckoning information or the GPS information based on a deviation between the dead reckoning information and the GPS information, and determine the selected information as the position information of the vehicle.

The controller is configured to select the dead reckoning information as the position information of the vehicle based on the deviation between the dead reckoning information and the GPS information being greater than a preset deviation.

The controller is configured to set a weight for the dead reckoning information and a weight for the GPS information based on the deviation between the dead reckoning information and the GPS information.

The controller is configured to correct the position information so that a deviation between the intensity data and the point cloud data is minimized.

The controller is configured to update the dead reckoning information in response to processing the corrected position information, the speed data, and the steering angle data.

The controller is configured to update the position information of the vehicle based on the updated dead reckoning information and the GPS information.

The controller is configured to update the intensity data around the vehicle in response to processing the high definition map received based on the updated position information, and compare the updated intensity data and the point cloud data to correct the updated position information.

According to an aspect of the disclosure, there is provided a driver assistance method, including: acquiring GPS information of a vehicle; acquiring point cloud data for an outside field of view of the vehicle; generating dead reckoning information of the vehicle by processing speed data and steering angle data of the vehicle; generating position information of the vehicle based on the dead reckoning information and the GPS information; acquiring intensity data around the vehicle by processing a high definition map received based on the position information; and correcting the position information by comparing the intensity data and the point cloud data.

The generating of the position information of the vehicle based on the dead reckoning information and the GPS information includes generating the position information of the vehicle by combining the dead reckoning information and the GPS information.

The generating of the position information of the vehicle by combining the dead reckoning information and the GPS information includes selecting one from the dead reckoning information or the GPS information based on a deviation between the dead reckoning information and the GPS information, and determining the selected information as the position information of the vehicle.

The selecting of one from the dead reckoning information or the GPS information comprises selecting the dead reckoning information as the position information of the vehicle based on the deviation between the dead reckoning information and the GPS information being greater than a preset deviation.

The generating of the position information of the vehicle by combining the dead reckoning information and the GPS information comprises setting a weight for the dead reckoning information and a weight for the GPS information based on the deviation between the dead reckoning information and the GPS information.

The correcting of the position information by comparing the intensity data and the point cloud data includes correcting the position information so that a deviation between the intensity data and the point cloud data is minimized.

The driver assistance method further includes updating the dead reckoning information by processing the corrected position information, the speed data and the steering angle data.

The driver assistance method further includes updating the position information of the vehicle based on the updated dead reckoning information and the GPS information.

The driver assistance method further includes updating the intensity data around the vehicle by processing the high definition map received based on the updated position information; and correcting the updated position information by comparing the updated intensity data and the point cloud data.

According to an aspect of the disclosure, there is provided a non-transitory computer-readable medium that stores computer-executable instructions when executed by a processor, cause the processor to: acquire GPS information of a vehicle; acquire point cloud data for an outside field of view of the vehicle; generate dead reckoning information by processing speed data and steering angle data of the vehicle; generate position information of the vehicle based on the dead reckoning information and the GPS information; acquire intensity data around the vehicle by processing a high definition map received based on the position information; and correct the position information by comparing the intensity data and the point cloud data.

The non-transitory computer-readable medium further stores instructions, which when executed by the processor, cause the processor to correct the position information so that a deviation between the intensity data and the point cloud data is minimized.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
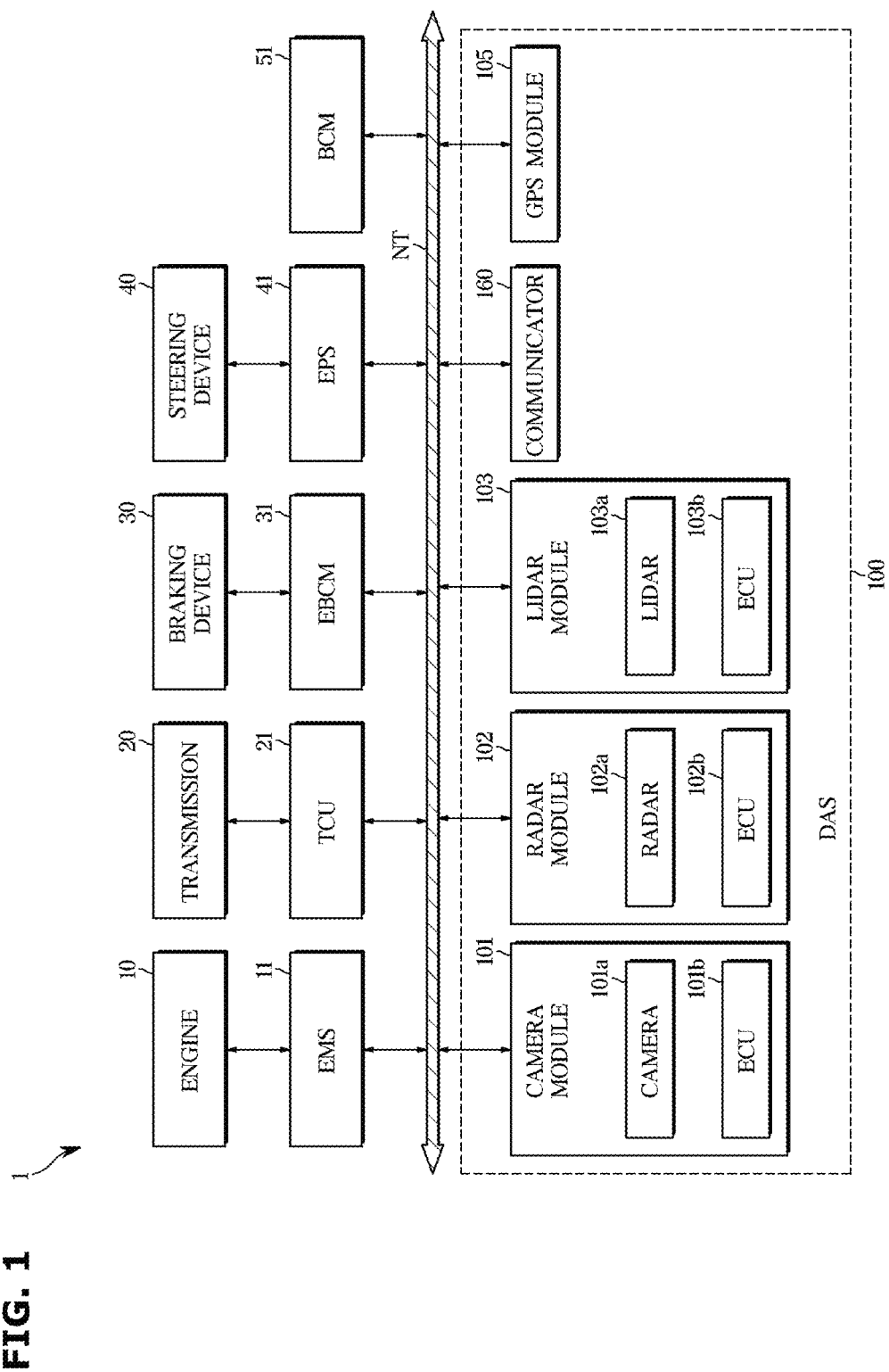
FIG. 1 illustrates a configuration of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 illustrates a configuration of a vehicle according to an embodiment.

As shown in FIG. 1, a vehicle 1 includes an engine 10, a transmission 20, a braking device 30, and a steering device 40. The engine 10 includes a cylinder and a piston, and may generate power for driving the vehicle 1. The transmission 20 includes a plurality of gears and may transmit the power generated by the engine 10 to vehicle wheels. The braking device 30 may decelerate or stop the vehicle 1 through friction with the vehicle wheels. The steering device 40 may change a driving direction of the vehicle 1.

The vehicle 1 may include a plurality of electronic components. For example, the vehicle 1 may include an engine management system (EMS) 11, a transmission control unit (TCU) 21, an electronic brake control module (EBCM) 31, an electronic power steering (EPS) 41, a body control module (BCM) 51, and a driver assistance system (DAS) 100.

The EMS 11 may control the engine 10 in response to a driver's acceleration intention through an accelerator pedal or a request from the DAS 100. For instance, the EMS 11 may control a torque of the engine 10.

The TCU 21 may control the transmission 20 in response to a driver's shift command through a shift lever and/or a driving speed of the vehicle 1. For example, the TCU 21 may adjust a shift ratio from the engine 10 to the vehicle wheels.

The EBCM 31 may control the braking device 30 in response to a driver's braking intention through a brake pedal and/or wheel slip. For example, the EBCM 31 may temporarily release the wheel braking in response to the wheel slip detected when braking the vehicle 1 (anti-lock braking system, ABS). The EBCM 31 may selectively release the wheel braking in response to oversteering and/or understeering detected when steering the vehicle 1 (electronic stability control, ESC). Also, the EBCM 31 may temporarily brake the wheels in response to the wheel slip detected when driving the vehicle 1 (traction control system, TCS).

A speed sensor (not shown) may be provided in the EBCM 31, and speed data obtained from the speed sensor (not shown) may be transmitted to the DAS 100 through a vehicle communication network (NT).

The EPS 41 may assist operations of the steering device 40 so that a driver may easily manipulate a steering wheel according to a driver's steering intention. For instance, the EPS 41 may assist the operations of the steering device 40 to decrease a steering force when driving at a low speed or when parking, and increase a steering force when driving at a high speed.

The EPS 41 may include a steering angle sensor (not shown) that detects a rotation angle of the steering wheel, and transmit steering angle data obtained from the steering angle sensor (not shown) to the DAS 100 through a vehicle communication network (NT).

The BCM 51 may control operations of electronic components that provide convenience to the driver or secure the driver safety. For example, the BCM 51 may control a head lamp, a wiper, a cluster, a multifunction switch, a turn signal, and the like.

The DAS 100 may assist the driver's operation (driving, braking, and steering). For instance, the DAS 100 may detect an environment (e.g., other vehicles, pedestrians, cyclists, lanes, road signs, traffic lights, etc.) in which the vehicle 1 is travelling, and control driving and/or braking and/or steering of the vehicle 1 in response to the detected environment.

As another example, the DAS 100 may receive a high definition map at a current location of the vehicle 1 from a server, and control driving and/or braking and/or steering of the vehicle 1 in response to the received high definition map.

The DAS 100 may provide the driver with a variety of functions. For example, the DAS 100 may provide functions such as a lane departure warning (LDW), a lane keeping assist (LKA), a high beam assist (HBA), an autonomous emergency braking (AEB), a traffic sign recognition (TSR), a smart cruise control (SCC), a blind spot detection (BSD), a inertia driving guide control, and the like.

The DAS 100 may include a camera module 101 that acquires image data around the vehicle 1 and a radar module 102 that acquires data about objects around the vehicle 1. The camera module 101 includes a camera 101a and an electronic control unit (ECU) 101b, and may photograph a front of the vehicle 1 and recognize other vehicles, pedestrians, cyclists, lanes, road signs, structures, etc. The radar module 102 includes a radar 102a and an ECU 102b, and may acquire a relative location, a relative speed, and etc., of the objects (e.g., other vehicles, pedestrians, cyclists, structures, etc.) around the vehicle 1.

That is, the DAS 100 may process the image data acquired by the camera module 101 and detection data acquired by the radar module 102, and detect the environment in which the vehicle 1 is travelling, a front object located in front of the vehicle 1 and a lateral object located on the sides of the vehicle 1, in response to processing the image data and the detection data.

Position information of the vehicle 1 is required to be determined so that the DAS 100 performs a fully autonomous driving. Accordingly, the DAS 100 may include a global positioning system (GPS) module 105.

The GPS module 105 may receive a satellite signal including navigation data from at least one GPS satellite. The DAS 100 may acquire a current location, a heading direction, and the like, of the vehicle 1 based on the satellite signal.

As an autonomous driving system is advanced, the DAS 100 for performing autonomous driving is required to calculate a position of the vehicle 1 more precisely.

Accordingly, the DAS 100 may include a light detection and ranging (lidar) module 103 that detects an object around the vehicle 1 by scanning around the vehicle 1. The lidar module 103 includes a lidar 103a and an ECU 103b, and may acquire a relative location, a relative speed, and etc., of a moving object (e.g., other vehicles, pedestrians, cyclists, structures, etc.) around the vehicle 1. Also, the lidar module 103 may acquire a shape and location of a fixed object (e.g., buildings, signs, traffic lights, speed bumps, etc.) around the vehicle 1.

Specifically, the lidar module 103 may acquire point cloud data for an outside field of view of the vehicle 1 to acquire the shape and location of the fixed object around the vehicle 1.

Also, the DAS 100 may include a communicator 160 that receives the high definition map at the current location of the vehicle 1 from a cloud server.

The communicator 160 may be implemented using a communication chip, an antenna, and related components to access a wireless communication network. That is, the communicator 160 may be implemented as various types of communication modules capable of long distance communication with an external server. That is, the communicator 160 may include a wireless communication module that may wirelessly transmit and receive data with the external server.

The above-described electronic components may communicate with each other via a vehicle communication network (NT). For example, the electronic components may transmit/receive data through Ethernet, media oriented systems transport (MOST), FlexRay, controller area network (CAN), local interconnect network (LIN), and the like. For instance, the DAS 100 may transmit a driving control signal, a braking signal, and a steering signal to the EMS 11, the EBCM 31, and the EPS 41, respectively, through the vehicle communication network (NT).

Figure 2:
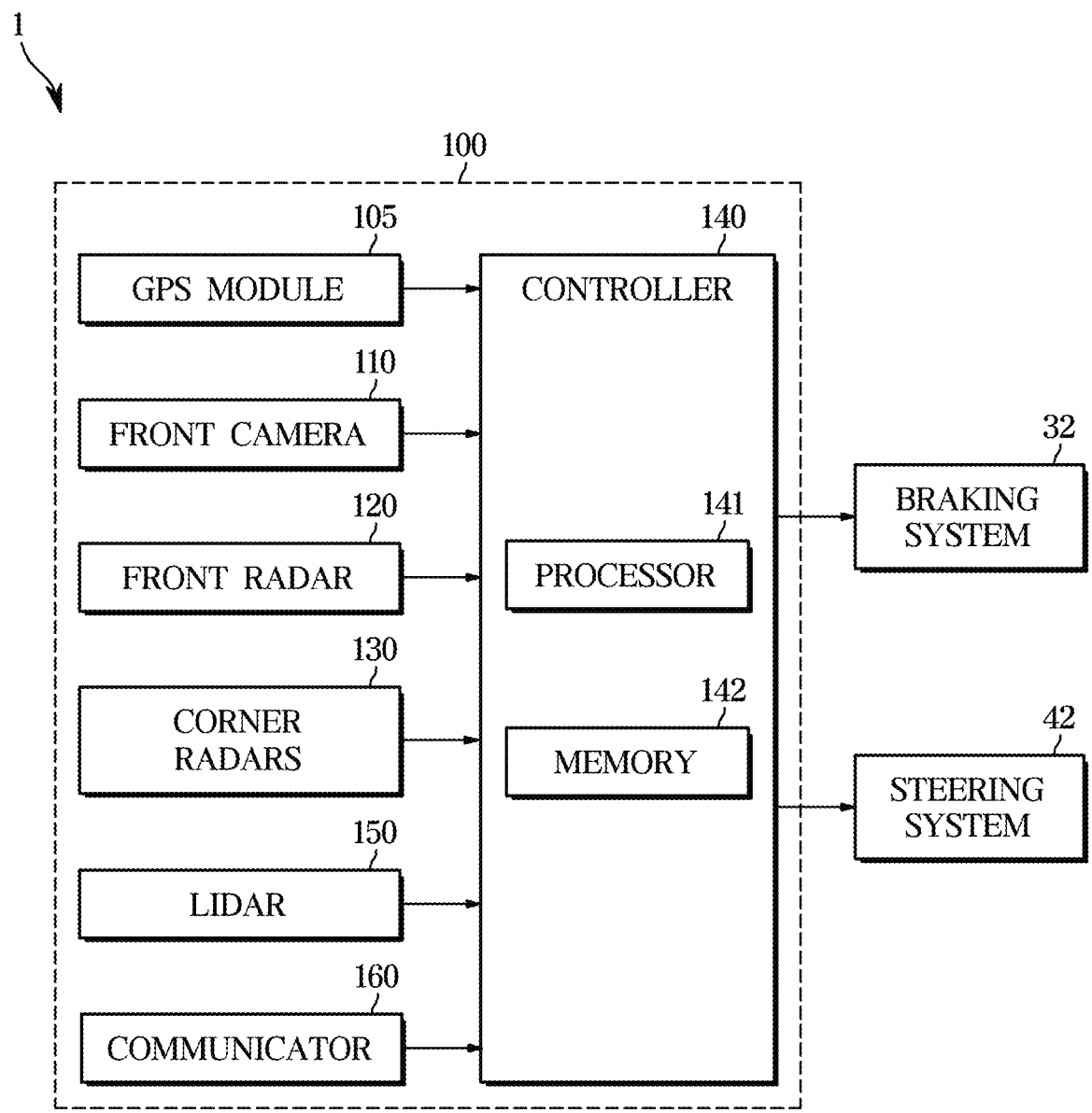
FIG. 2 is a control block diagram illustrating a driver assistance system according to an embodiment.
Figure 3:
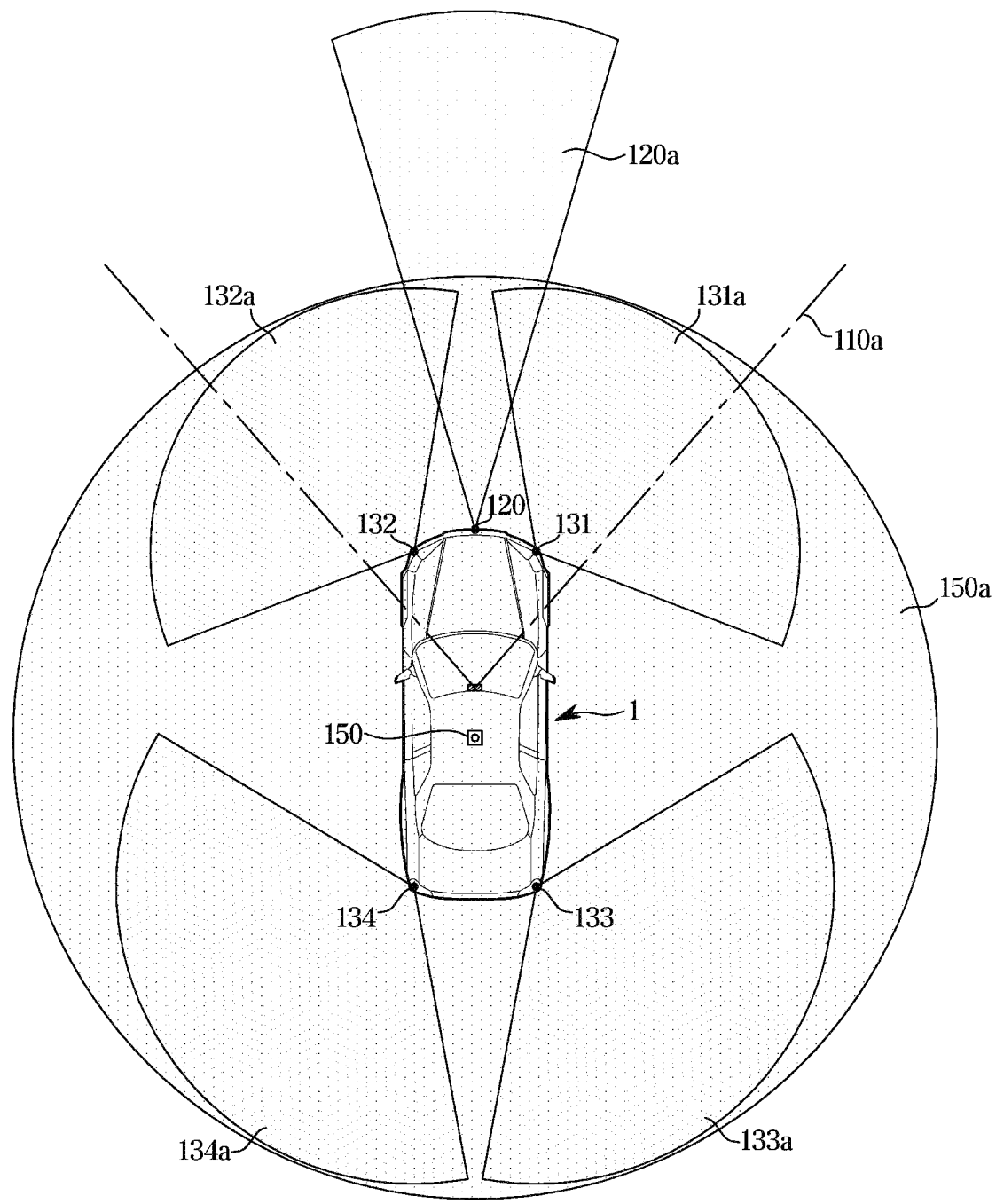
FIG. 3 is a diagram illustrating a camera, a radar and a lidar included in a driver assistance system according to an embodiment.

FIG. 2 is a control block diagram illustrating a driver assistance system according to an embodiment. FIG. 3 is a diagram illustrating a camera, a lidar and a radar included in a driver assistance system according to an embodiment.

As shown in FIG. 2, the vehicle 1 may include a braking system 32, a steering system 42 and the DAS 100.

The braking system 32 may include the EBCM 31 (refer to FIG. 1) and the braking device 30 (refer to FIG. 1), and the steering system 42 may include the EPS 41 (refer to FIG. 1) and the steering device 40 (refer to FIG. 1).

The braking system 32 and the steering system 42 may control the vehicle 1 to enable the vehicle 1 to perform autonomous driving based on controls signals of the DAS 100.

The DAS 100 may include the GPS module 105, a front camera 110, a front radar 120, a plurality of corner radars 130, a lidar 150 and the communicator 160.

As described above, the GPS module 105 may acquire GPS information of the vehicle 1. The GPS information may include position data of the vehicle 1, and in general, the position data obtained by the GPS module 105 has a deviation from an actual position of the vehicle 1.

As shown in FIG. 3, the front camera 110 may have a field of view 110a facing the front of the vehicle 1. For example, the front camera 110 may be installed on a front windshield of the vehicle 1, but may be provided at any position as long as it has a field of view facing the front of the vehicle 1.

The front camera 110 may photograph a front of the vehicle 1 and acquire image data of the front of the vehicle 1.

The front camera 110 may include a plurality of lens and image sensors. The image sensors may include a plurality of photodiodes converting light into an electrical signal, and the plurality of photodiodes may be arranged in a two-dimensional (2D) matrix.

The front camera 110 may be electrically connected to the controller 140. For instance, the front camera 110 may be connected to the controller 140 via a vehicle communication network (NT), a hard wire, or a printed circuit board (PCB).

The front camera 110 may transmit the image data of the front of the vehicle 1 to the controller 140.

As shown in FIG. 3, the front radar 120 may have a field of sensing 120a facing the front of the vehicle 1. For example, the front radar 120 may be installed in a grille or a bumper of the vehicle 1.

The front radar 120 may include a transmission antenna (or a transmission antenna array) that transmits a transmission wave toward the front of the vehicle 1, and a receiving antenna (or a receiving antenna array) that receives a reflected wave reflected from an object. The front radar 120 may acquire front detection data from the transmission wave transmitted by the transmission antenna and the reflected wave received by the receiving antenna. The front detection data may include distance information and speed information about other vehicles, pedestrians or cyclists located in front of the vehicle 1. The front radar 120 may calculate a relative distance to an object based on a phase difference (or a time difference) between the transmission wave and the reflected wave, and calculate a relative speed of the object based on a frequency difference between the transmission wave and the reflected wave.

For instance, the front radar 120 may be connected to the controller 140 via a vehicle communication network (NT), a hard wire, or a PCB. The front radar 120 may transmit the front detection data to the controller 140.

The plurality of corner radars 130 includes a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

As shown in FIG. 3, the first corner radar 131 may have a field of sensing 131a facing the front right side of the vehicle 1, and the front radar 120 may be installed on a right side of a front bumper of the vehicle 1. The second corner radar 132 may have a field of sensing 132a facing the front left side of the vehicle 1, and may be installed on a left side of the front bumper of the vehicle 1. The third corner radar 133 may have a field of sensing 133a facing the rear right side of the vehicle 1, and may be installed on a right side of a rear bumper of the vehicle 1. The fourth corner radar 134 may have a field of sensing 134a facing the rear left side of the vehicle 1, and may be installed on a left side of the rear bumper of the vehicle 1.

Each of the first to fourth corner radars 131, 132, 133 and 134 may include a transmission antenna and a receiving antenna. The first to fourth corner radars 131, 132, 133 and 134 may acquire first corner detection data, second corner detection data, third corner detection data, and fourth corner detection data, respectively. The first corner detection data may include distance information and speed information about other vehicles, pedestrians, cyclists, or structures (hereinafter, referred to as "object") located on the front right side of the vehicle 1. The second corner detection data may include distance information and speed information about an object located on the front left side of the vehicle 1. The third and fourth corner detection data may include distance information and speed information about objects located on the rear right side or and the rear left side of the vehicle 1.

For example, each of the first to fourth corner radars 131, 132, 133 and 134 may be connected to the controller 140 via a vehicle communication network (NT), a hard wire, or a PCB. Also, each of the first to fourth corner radars 131, 132, 133 and 134 may transmit the first to fourth corner detection data to the controller 140.

The lidar 150 may acquire a relative position, a relative speed, and the like, of a moving object (e.g., other vehicles, pedestrians, cyclists, structures, etc.) around the vehicle 1. Also, the lidar 150 may acquire a shape and location of a fixed object (e.g., buildings, signs, traffic lights, speed bumps, etc.) around the vehicle 1. The lidar 150 may be installed on the vehicle 1 to have an outside field of view 150a of the vehicle 1 and acquire point cloud data with respect to the outside field of view 150a.

For example, as shown in FIG. 3, the lidar 150 may be provided in an exterior of the vehicle 1 to have the outside field of view 150a of the vehicle 1, and more specifically, may be provided on a roof of the vehicle 1.

The lidar 150 may include a light emitter that emits light, a light receiver that receives light in a preset direction among reflected light when the light emitted from the light emitter is reflected from an obstacle, and a PCB to which the light emitter and the light receiver are fixed. In this instance, the PCB is provided on a support plate rotated by a rotation driving part, thereby may be rotated 360 degrees in a clockwise or counterclockwise direction.

That is, the support plate may rotate about an axis according to power transmitted from the rotation driving part, and the light emitter and the light receiver may be fixed to the PCB and rotate 360 degrees in a clockwise or counterclockwise direction along with the rotation of the PCB. Through the above, the lidar 150 may detect an object in all directions 150a by emitting and receiving light 360 degrees.

The light emitter is for emitting light (e.g., an infrared laser), and a single light emitter or a plurality of light emitter may be provided according to embodiments.

The light receiver is provided to receive light in a preset direction among reflected light when the light emitted from the light emitter is reflected from an obstacle. An output signal generated by receiving light in the light receiver may be provided to an object detection process of the controller 140.

The light receiver may include a condensing lens for condensing the received light and an optical sensor for detecting the received light. According to embodiments, the light receiver may also include an amplifier for amplifying the light detected by the optical sensor.

The lidar 150 may receive data about numerous points on an external surface of an object, and acquire point cloud data which is a set of data for such points.

As described above, the communicator 160 may receive a high definition map based on position information of the vehicle 1 from a server. The high definition map may refer to a map including information about traffic lights, road signs, curbs, markings, various types of structures, as well as lane information such as a center line, a boundary line, etc., in a three-dimensional (3D) digital form.

Such high definition map may include intensity data. The intensity data may refer to data on points corresponding to boundaries of structures, etc., on the high definition map, i.e., data on points where gray level values of pixels change rapidly and/or data on points where gray level values of pixels are greater than or equal to a preset value. Also, when a high definition map is acquired by another lidar sensor, intensity data may refer to point cloud data acquired by the other lidar sensor.

That is, the intensity data may include data on boundaries of roads, curbs, structures, and the like, on the high definition map.

The controller 140 may include the ECU 101b (refer to FIG. 1) of the camera module 101 (refer to FIG. 1), and/or the ECU 102b (refer to FIG. 1) of the radar module 102 (refer to FIG. 1), and/or the ECU 103b (refer to FIG. 1) of the lidar module 103 (refer to FIG. 1), and/or a separate integrated controller.

The controller 140 may include at least one processor 141 and at least one memory 142.

The processor 141 may process front image data of the front camera 110, front detection data of the front radar 120, and point cloud data of the lidar 150, and generate a braking signal and a steering signal for controlling the braking system 32 and the steering system 42, respectively.

Also, the processor 141 may process information of the vehicle 1 received through a vehicle communication network (NT), and generate dead reckoning information in response to processing the information of the vehicle 1. In this instance, the information of the vehicle 1 may include various data for estimating position information of the vehicle 1, such as speed data, steering angle data, yaw data, acceleration data, and the like.

In addition, the processor 141 may process the high definition map, and acquire intensity data around the vehicle 1 in response to processing the high definition map.

To this end, the processor 141 may include an image processor for processing the front image data of the front camera 110 and high definition map data, and/or a digital signal processor for processing detection data of the front radar 120 and/or the high definition map data and/or point cloud data of the lidar 150, and/or a micro control unit (MCU) or a domain control unit (DCU) for generating a control signal to control the braking system 32 and the steering system 42.

The memory 142 may temporarily or semi-permanently store the image data received from the front camera 110 and/or the detection data received from the radar and/or the point cloud data obtained from the lidar 150 and/or the high definition map received from the communicator 160. Also, the memory 142 may temporarily or semi-permanently store a processing result of the image data and/or the detection data and/or the point cloud data and/or the high definition map by the processor 141.

To this end, the memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

Each constituent component of the vehicle 1 has been described above. Hereinafter, operations of acquiring position information of the vehicle 1 in the DAS 100 is described in detail with reference to FIGS. 4 to 7.

Figure 4:
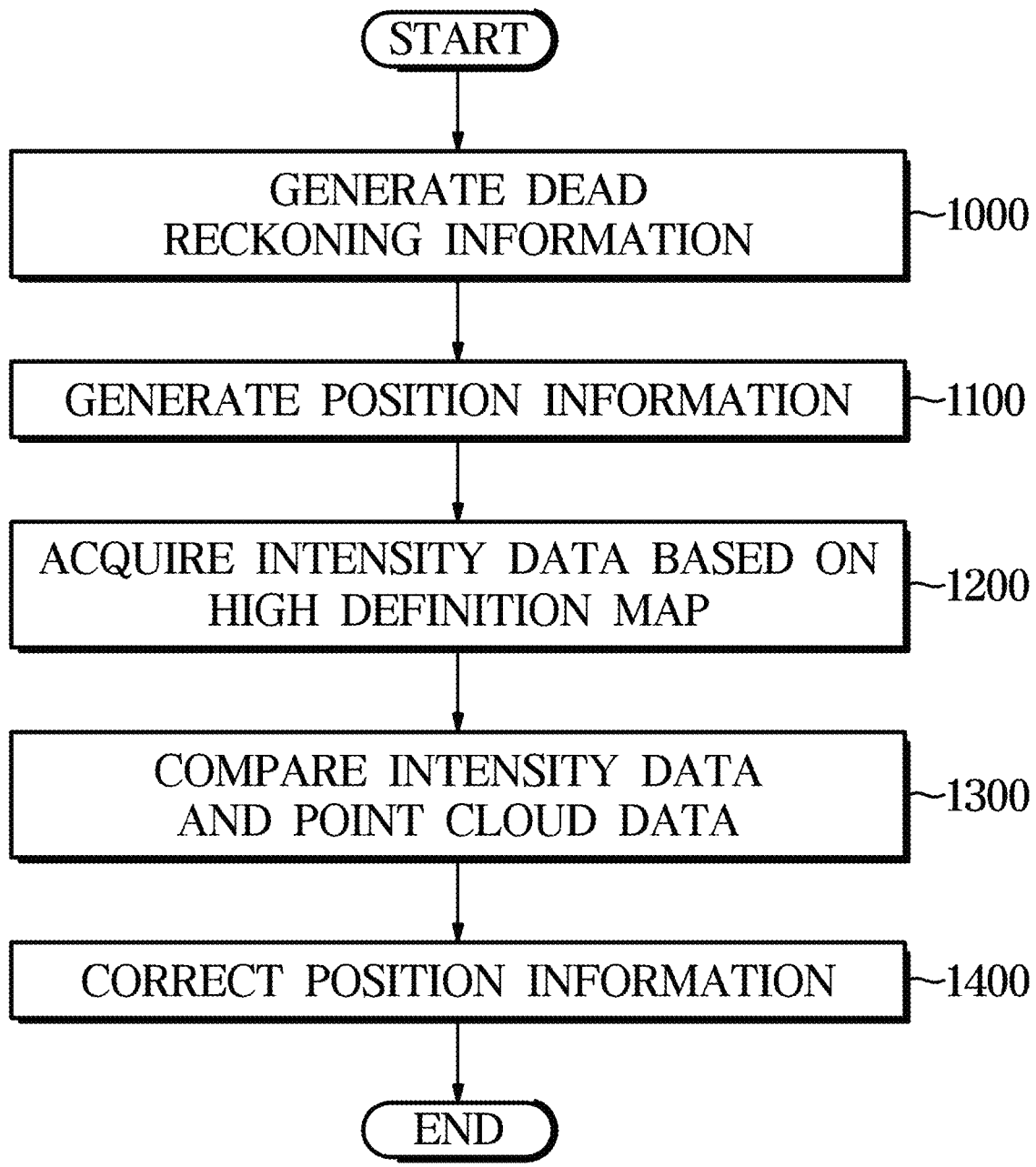
FIG. 4 is a flowchart illustrating a driver assistance method according to an embodiment.
Figure 5:
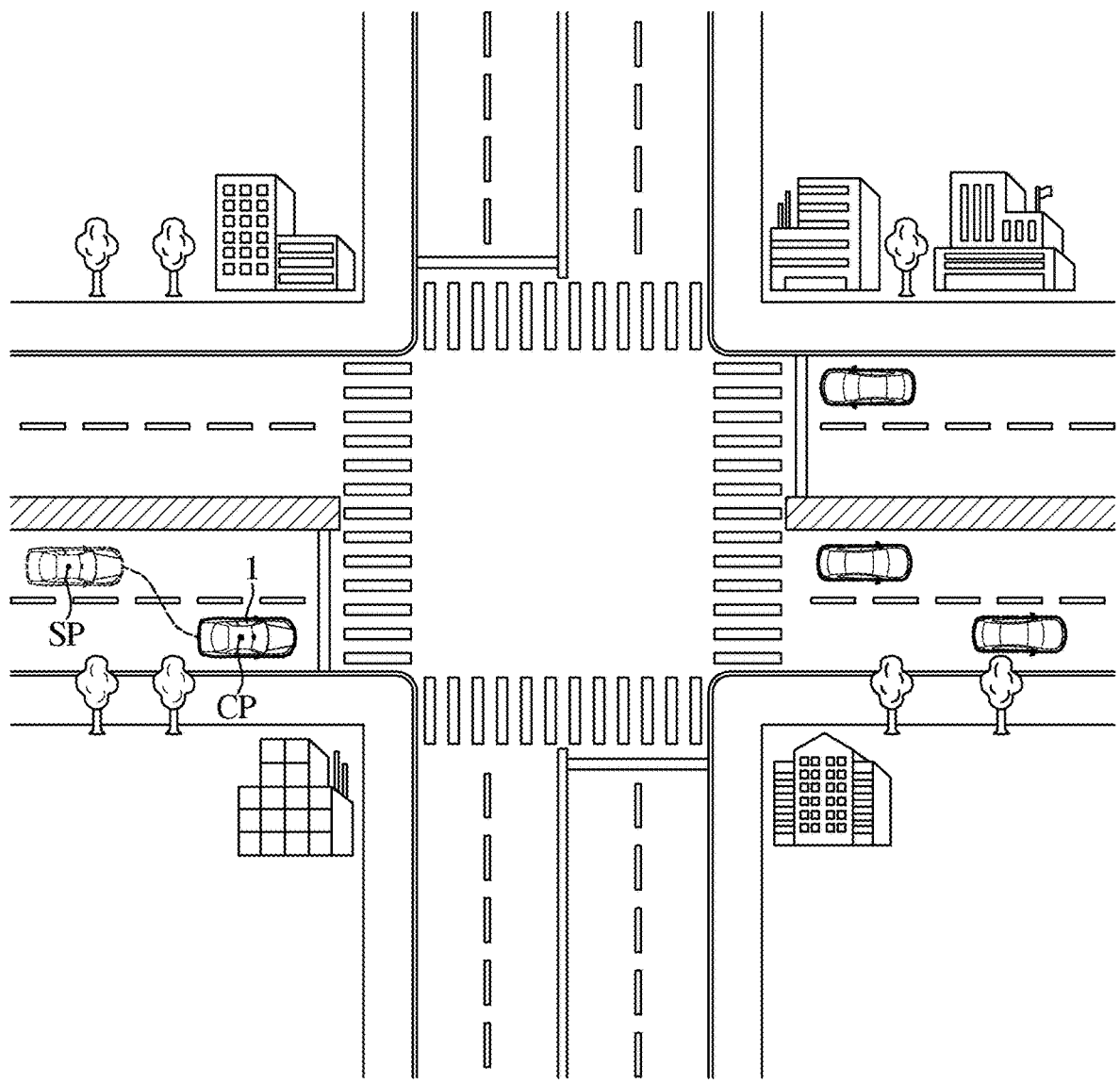
FIG. 5 is a diagram illustrating vehicle position information generated based on dead reckoning information.
Figure 6:
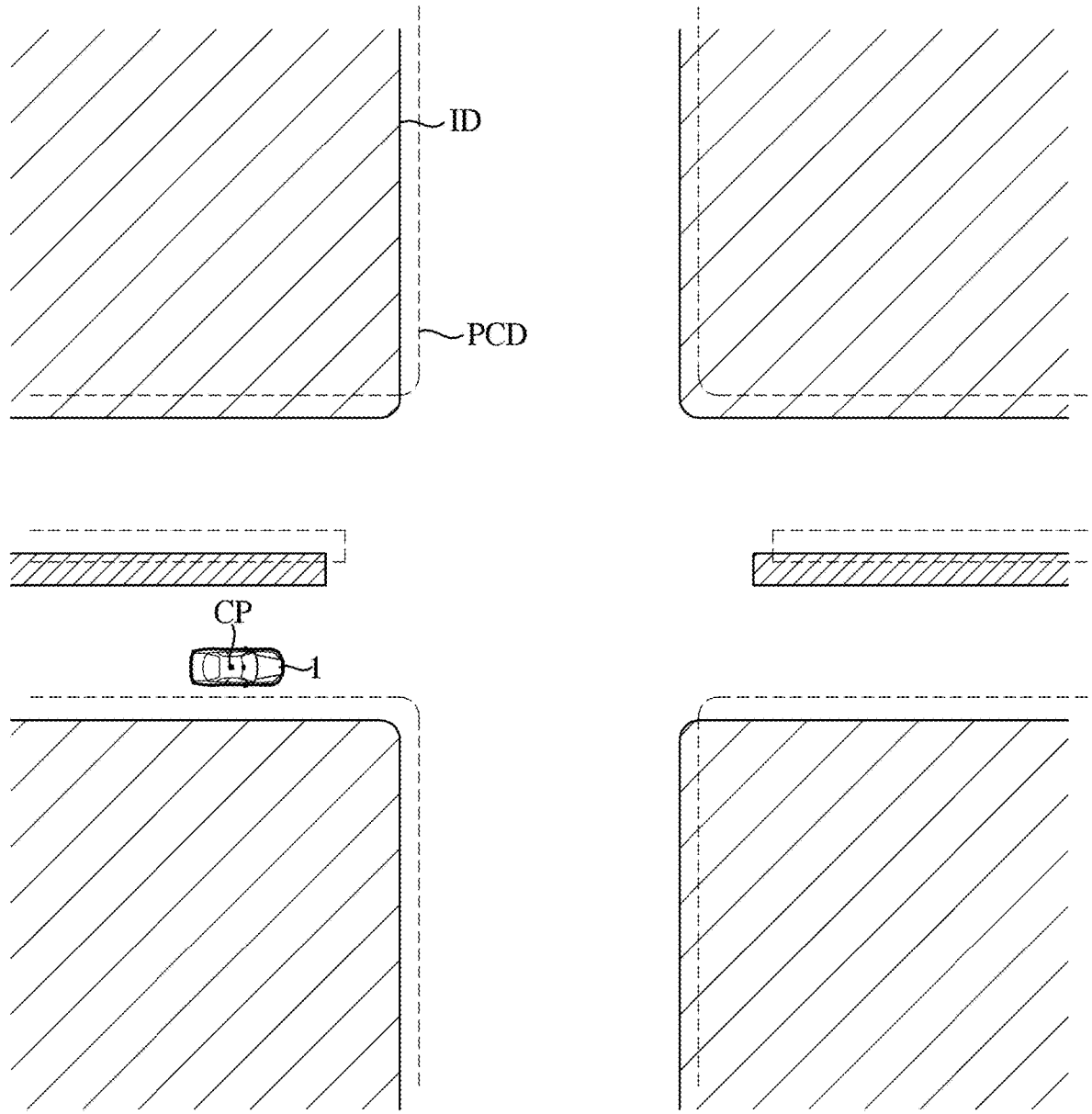
FIG. 6 is a diagram illustrating an example of intensity data of a high definition map and point cloud data obtained from a lidar.
Figure 7:
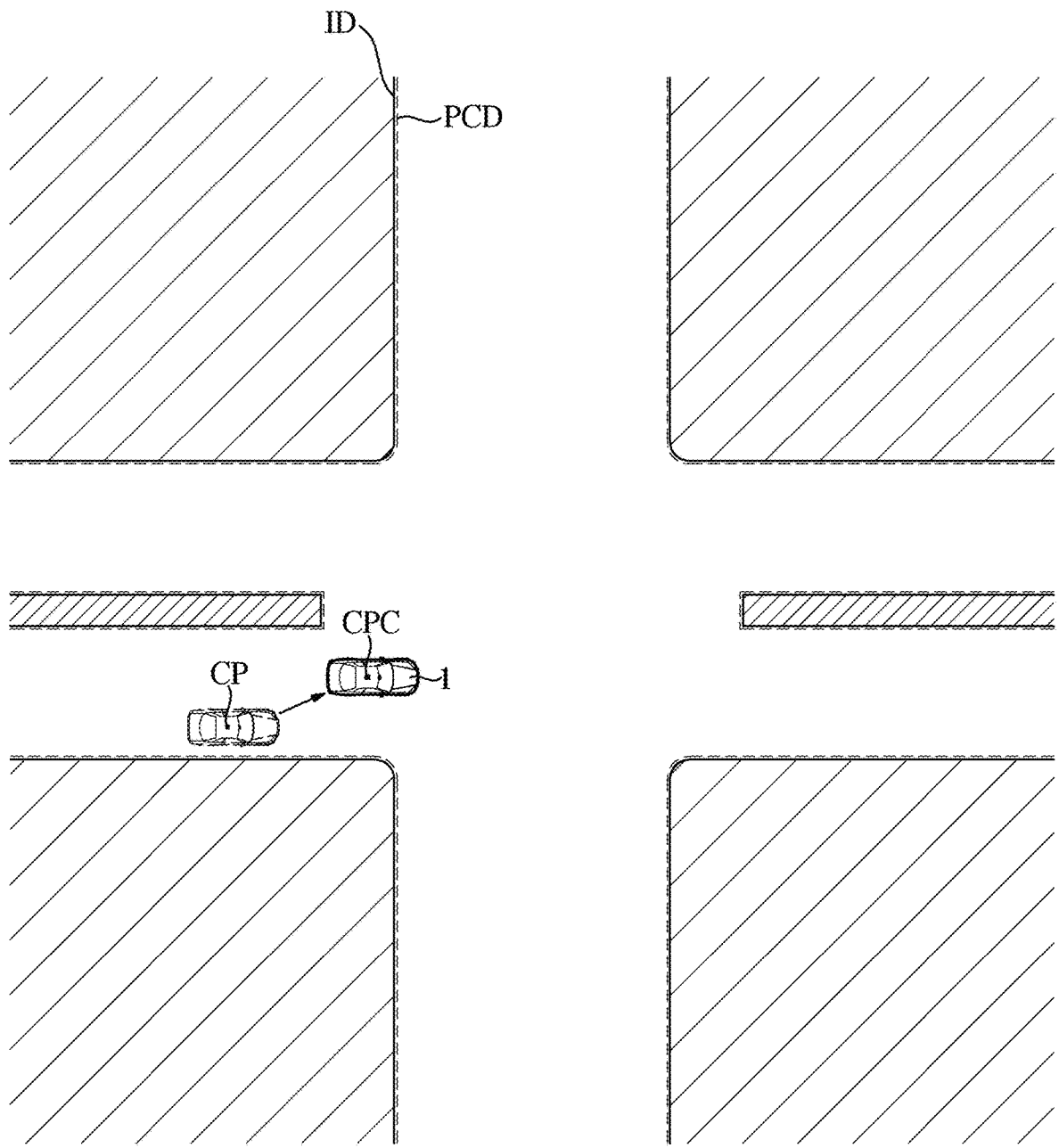
FIG. 7 is a diagram illustrating an example of intensity data of a high definition map and point cloud data obtained from a lidar when vehicle position information is corrected.

FIG. 4 is a flowchart illustrating a driver assistance method according to an embodiment. FIG. 5 is a diagram illustrating vehicle position information generated based on dead reckoning information. FIG. 6 is a diagram illustrating an example of intensity data of a high definition map and point cloud data obtained from a lidar. FIG. 7 is a diagram illustrating an example of intensity data of a high definition map and point cloud data obtained from a lidar when vehicle position information is corrected.

Referring to FIG. 4, the controller 140 may generate dead reckoning information by processing speed data and steering angle data received through a vehicle communication network (1000).

Referring to FIG. 5, the controller 140 may calculate a movement distance and direction of the vehicle 1 by processing the speed data and the steering angle data, and generate the dead reckoning information of the vehicle 1 based on a standard position (SP) and the movement distance and direction of the vehicle 1.

The dead reckoning information may refer to data on a current position (CP) of the vehicle 1 estimated in response to processing the speed data and the steering angle data by the controller 140, as described above.

The controller 140 may generate position information of the vehicle 1 by correcting the dead reckoning information based on GPS information received from the GPS module 105 (1100).

As described above, in general, the GPS information may have a deviation from an actual position value of the vehicle 1, and the dead reckoning information may also have a deviation from the actual position value of the vehicle 1.

Accordingly, the controller 140 may generate more accurate position information by combining the GPS information and the dead reckoning information.

Specifically, the controller 140 may select the dead reckoning information or the GPS information as the position information of the vehicle 1, based on the deviation between the dead reckoning information and the GPS information. That is, the controller 140 may select one from the dead reckoning information or the GPS information, based on the deviation between the dead reckoning information and the GPS information, and determine the selected information as the position information of the vehicle 1.

For example, when the deviation between the dead reckoning information and the GPS information is greater than a preset deviation, the controller 140 may determine that the GPS information is erroneous, and determine the dead reckoning information as the position information of the vehicle 1. Also, when the deviation between the dead reckoning information and the GPS information is equal to or less than the preset deviation, the controller 140 may generate the position information of the vehicle 1 by combining the dead reckoning information and the GPS information.

For instance, the controller 140 may set a weight for the dead reckoning information and a weight for the GPS information to be different from each other, based on a deviation value between the dead reckoning information and the GPS information. Also, when it is determined that the vehicle 1 is located in a place where it is difficult to receive the GPS information, the controller 140 may assign a greater weight to the dead reckoning information.

As described above, the controller 140 may generate more accurate position information by combining the dead reckoning information based on GPS information.

The communicator 160 may receive a high definition map based on the position information of the vehicle 1 from a server, and the controller 140 may acquire intensity data around the vehicle 1 based on the high definition map received through the communicator 160 or stored in the memory 142 (1200).

Referring to FIG. 6, the controller 140 may determine a position (CP) of the vehicle 1 on the high definition map, and acquire the intensity data (ID) around the vehicle 1.

The controller 140 may compare the intensity data (ID) acquired by processing the high definition map and point cloud data (PCD) obtained from the lidar 150 (1300).

For example, the controller 140 may determine a matching degree between the intensity data (ID) acquired by processing the high definition map and the point cloud data (PCD) obtained from the lidar 150.

The controller 140 may calculate a matching score that quantifies the matching degree between the intensity data and the point cloud data. When the matching score is equal to or less than a preset value, the controller 140 may correct a position of the vehicle 1 on the high definition map so that the matching score is maximized.

Specifically, the point cloud data (PCD) may include X, Y and Z coordinate values for numerous points and the intensity data (ID) may also include X, Y and Z coordinate values for numerous points. Accordingly, the controller 140 may compare the X, Y and Z coordinate values for the numerous points included in the point cloud data (PCD) and the X, Y and Z coordinate values for the numerous points included in the intensity data (ID), and calculate a matching score to be smaller as a difference increases, and a matching score to be larger as the difference decreases.

For example, the controller 140 may calculate a root mean square error (RMSE) between a set of coordinate values included in the intensity data (ID) and a set of coordinate values included in the point cloud data (PCD), and calculate a matching score based on the RMSE value.

Also, the controller 140 may perform parallel translation or rotate the coordinates of the coordinate values included in the intensity data (ID) so that the calculated matching score is maximized, i.e., the RMSE is minimized.

For example, when the set of coordinate values included in the intensity data (ID) is {(1, 1, 1), (1, 2, 1), (1, 3, 1)} and the set of coordinate values included in the point cloud data (PCD) is {(2, 1, 1), (2, 2, 1), (2, 3, 1)}, the controller 140 may maximize the matching score between the intensity data (ID) and the point cloud data (PCD), by translating the coordinates of coordinate values included in the intensity data (ID) along x-axis by 1. In this instance, the controller 140 may correct the position information of the vehicle 1 based on the parallel translation of the coordinates of coordinate values included in the intensity data along x-axis by 1.

That is, the controller 140 may correct the position information of the vehicle 1 so that a deviation between the intensity data (ID) and the point cloud data (PCD) is minimized (1400).

Referring to FIG. 7, when the coordinates of coordinate values included in the intensity data (ID) are translated to the upper right, the deviation between the intensity data (ID) and the point cloud data (PCD) may be minimized. In response to parallel translation of the coordinates of coordinate values included in the intensity data (ID) to the upper right, the controller 140 moves the position of the vehicle 1 to the upper right on the high definition map to correct the position of the vehicle 1, and thus the deviation between the intensity data (ID) and the point cloud data (PCD) may be minimized.

That is, the controller 140 may generate accurate position information (CPC) of the vehicle 1 by correcting the position information (CP) generated based on the dead reckoning information and the GPS information.

As described above, according to the embodiment, by generating the position information of the vehicle 1 based on the dead reckoning information and the GPS information, and then comparing the intensity data (ID) of the high definition map and the point cloud data (PCD) of the lidar 150 based on the position information, more precise position information may be generated. In this instance, the controller 140 may acquire accurate position information of the vehicle 1, without extracting landmark information or feature point information (e.g., road marking information or lane information) around the vehicle 1 based on the point cloud data (PCD) received from the lidar 150.

Therefore, according to the embodiment, even when landmarks or feature points around the vehicle 1 do not exist, more accurate position information of the vehicle 1 may be obtained, and thus positioning performance is not reduced depending on the presence or absence of landmarks or feature points.

According to an embodiment, the controller 140 may set a standard position of the vehicle 1 based on the corrected position information, and process the speed data and the steering angle data to update the dead reckoning information.

Also, the controller 140 may update the position information of the vehicle 1 based on the updated dead reckoning information and the GPS information. In response to processing the high definition map received based on the updated position information, the controller 140 may update intensity data around the vehicle 1 and compare the updated intensity data and point cloud data to correct the updated position information.

According to the embodiment, precise position information may be obtained by repeating the above-described operations, thereby may implement a safer autonomous driving system.

As is apparent from the above, according to the embodiments of the disclosure, the driver assistance system and the driver assistance method can acquire an accurate position of a vehicle regardless of accuracy of feature point information and landmark information obtained from a lidar.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:
1. A driver assistance system, comprising:
 a global positioning system (GPS) module configured to acquire GPS information of a vehicle;
 a lidar configured to acquire point cloud data for an outside field of view of the vehicle;

a communicator configured to receive a high definition; and a controller comprising at least one processor configured to process the point cloud data, the high definition map, speed data of the vehicle and steering angle data of the vehicle, wherein the controller is configured to generate dead reckoning information of the vehicle in response to processing the speed data and the steering angle data, generate position information of the vehicle based on the dead reckoning information and the GPS information, acquire intensity data around the vehicle in response to processing the high definition map received based on the position information, compare the intensity data and the point cloud data to correct the position information, and control at least one of driving, braking, and steering of the vehicle based on the corrected position information; and the controller is further configured to:
when a deviation between the dead reckoning information and the GPS information is greater than a preset deviation, select the dead reckoning information as the position information of the vehicle, and
when the deviation between the dead reckoning information and the GPS information is less than the preset deviation, set a weight for the dead reckoning information and a weight for the GPS information.

2. The driver assistance system of claim 1, the weight for the dead reckoning information and the weight for the GPS information are set based on the deviation between the dead reckoning information and the GPS information.

3. The driver assistance system of claim 1, wherein the controller is configured to correct the position information so that the deviation between the intensity data and the point cloud data is minimized.

4. The driver assistance system of claim 1, wherein the controller is configured to update the dead reckoning information in response to processing the corrected position information, the speed data, and the steering angle data.

5. The driver assistance system of claim 4, wherein the controller is configured to update the position information of the vehicle based on the updated dead reckoning information and the GPS information.

6. The driver assistance system of claim 5, wherein the controller is configured to update the intensity data around the vehicle in response to processing the high definition map received based on the updated position information, and compare the updated intensity data and the point cloud data to correct the updated position information.

7. A driver assistance method, comprising:
acquiring GPS information of a vehicle;
acquiring point cloud data for an outside field of view of the vehicle;
generating dead reckoning information of the vehicle by processing speed data and steering angle data of the vehicle;
generating position information of the vehicle based on the dead reckoning information and the GPS information;
acquiring intensity data around the vehicle by processing a high definition map received based on the position information;
correcting the position information by comparing the intensity data and the point cloud data; and controlling at least one of driving, braking, and steering of the vehicle based on the corrected position information;
wherein the correcting of the position information comprises:
when a deviation between the dead reckoning information and the GPS information is greater than a preset deviation, selecting the dead reckoning information as the position information of the vehicle, and
when the deviation between the dead reckoning information and the GPS information is less than the preset deviation, setting a weight for the dead reckoning information and a weight for the GPS information.

8. The driver assistance method of claim 7, wherein the correcting of the position information by comparing the intensity data and the point cloud data comprises correcting the position information so that the deviation between the intensity data and the point cloud data is minimized.

9. The driver assistance method of claim 7, further comprising: updating the dead reckoning information by processing the corrected position information, the speed data and the steering angle data.

10. The driver assistance method of claim 9, further comprising: updating the position information of the vehicle based on the updated dead reckoning information and the GPS information.

11. The driver assistance method of claim 10, further comprising: updating the intensity data around the vehicle by processing the high definition map received based on the updated position information; and correcting the updated position information by comparing the updated intensity data and the point cloud data.

12. A non-transitory computer-readable medium storing computer-executable instructions when executed by a processor, cause the processor to:
acquire GPS information of a vehicle;
acquire point cloud data for an outside field of view of the vehicle;
generate dead reckoning information by processing speed data and steering angle data of the vehicle;
generate position information of the vehicle based on the dead reckoning information and the GPS information;
acquire intensity data around the vehicle by processing a high definition map received based on the position information;
correct the position information by comparing the intensity data and the point cloud data; and
control at least one of driving, braking, and steering of the vehicle based on the corrected position information;
the processor is further configured to:
when a deviation between the dead reckoning information and the GPS information is greater than a preset deviation, select the dead reckoning information as the position information of the vehicle, and
when the deviation between the dead reckoning information and the GPS information is less than the preset deviation, set a weight for the dead reckoning information and a weight for the GPS information.

13. A non-transitory computer-readable medium of claim 12, further storing instructions, which when executed by the processor, cause the processor to:
correct the position information so that the deviation between the intensity data and the point cloud data is minimized.

* * * * *